United States Patent [19]

Namikawa et al.

[11] Patent Number: 4,631,717
[45] Date of Patent: Dec. 23, 1986

[54] HIGH DENSITY INFORMATION RECORDS OF AN ELECTROSTATIC CAPACITANCE TYPE

[75] Inventors: Kazuhira Namikawa; Toshiaki Hamaguchi; Mutsuaki Nakamura; Akio Kuroda, all of Yokohama; Akio Hata; Noriki Fujii, both of Shinnanyo, all of Japan

[73] Assignees: Victor Company of Japan, Ltd.; Tokuyama Sekisui Industry Corporation, Limited, both of Japan

[21] Appl. No.: 675,014

[22] Filed: Nov. 26, 1984

[30] Foreign Application Priority Data

Nov. 26, 1983 [JP] Japan ................................ 58-221426

[51] Int. Cl.[4] .......................... G08K 3/04; G11B 5/00
[52] U.S. Cl. ..................................... 369/276; 428/457; 428/480; 523/174
[58] Field of Search ................ 430/137, 138; 428/480, 428/457; 523/174; 369/276

[56] References Cited

U.S. PATENT DOCUMENTS

| 4,396,660 | 8/1983 | Hata et al. | 523/174 |
| 4,464,279 | 8/1984 | Arai | 428/457 |
| 4,465,615 | 8/1984 | Hata et al. | 523/174 |
| 4,492,734 | 1/1985 | Ogawa et al. | 428/480 |
| 4,503,120 | 3/1985 | Yamauchi et al. | 428/480 |

FOREIGN PATENT DOCUMENTS 57-177047 10/1982 Japan .

*Primary Examiner*—John L. Goodrow
*Attorney, Agent, or Firm*—Lowe, Price, LeBlanc, Becker & Shur

[57] ABSTRACT

High density information records formed from conductive resin compositions which comprise a graft polymer obtained by subjecting vinyl chloride monomer to graft polymerization with a copolymer of ethylene and vinyl acetate having a content of vinyl acetate of not less than 35 wt % and a melt index up to 20 and prepared according to a solution polymerization technique. The conductive composition further comprises predetermined amounts of a conductive material and a lubricant of a specific type. The lubricant is an ester between aliphatic acid and alcohol having a hydroxyl value not larger than 15.

8 Claims, No Drawings

HIGH DENSITY INFORMATION RECORDS OF AN ELECTROSTATIC CAPACITANCE TYPE

BACKGROUND OF THE INVENTION

1. Field of the Invention

This invention relates to information recording and more particularly, to high density information record of a variable electrostatic capacitance type, such as video or digital audio discs, on which an information signal is recorded as geometric variations.

2. Description of the Prior Art

In certain information playback systems of the electrostatic capacitance type, an information signal is recorded as geometric variations by forming pits in a spiral plane or groove or in concentric planes or grooves, thereby obtaining high density information records such as video or digital audio discs. The individual pits of the record are very small and are arranged in a very high density. When the geometric variations are tracked with a pickup stylus such as of diamond having an electrode, capacitive variations are established between the stylus and the record according to the geometric variations, so that the recorded information signal can be played back.

Several kinds of information signal records of the electrostatic capacitance type have been proposed for use in the above type of electrostatic capacitance playback system. In one such record medium, an electrode is provided on one or both surfaces of a record substrate on which geometric variations are press molded according to the information signal. This permits formation of an electrostatic capacitance to be established between the record electrode and an electrode of a pickup stylus. More particularly, the record substrate is covered with a thin metallic film having a thickness of several hundred angstrom on which pits are formed as desired, and also with a several hundred angstrom thick dielectric layer overlying the metallic film. The dielectric layer serves to prevent short circuiting of the electrodes and increase the dielectric constant between the electrodes. The record of this type needs a number of fabricating steps including press molding the record substrate, depositing the thin metallic film and the dielectric layer, and the like. Thus, the fabrication is complicated and troublesome with the need of a relatively large-scale manufacturing apparatus. Thus, the production cost becomes very high.

Another type of known information record of the electrostatic capacitance type is one which is obtained by press molding a conductive plastic composition comprising a resin such as polyvinyl chloride and several ten percent of carbon black so that the information signal is recorded as geometric variations. In this type of record, an electrostatic capacitance is established between the electrode of a pickup stylus and the record itself. Thus, the step of depositing a thin metallic film on a substrate is not needed. Because fine particles of carbon black are individually covered with the resin, the dielectric film is not necessary. Thus, this type of record can be simply manufactured at a relatively lost cost.

However, when the record made of the conductive resin composition comprising carbon black is set in a playback system and played back over a long term, its surface is worn by means of the pickup stylus contacting therewith. This results in deformation of the geometric variations or pits formed on the record, causing capacitive variations to vary. Thus, reliable playback is not possible. Especially, when the record is a video disc record and is subjected to still reproduction or freeze frame, a given portion of the disc is repeatedly contacted with the pickup stylus at a pressure of 400 to 500 kg/cm$^{t2}$ at a rate of 15 times/second with the serious problem that the given portion is worn. In addition, the conductive resin compositions are not readily moldable.

A further type of information record of the electrostatic capacitance form was proposed in order to solve the problems described above with regard to the moldability and disc wear, in which the resins contained in the conductive compositions have improved properties. More specifically, Japanese Laid-open Patent Application No. 57-177047 describes a video disc which is obtained by molding a conductive resin composition comprising a mixture of a graft polymer obtained by subjecting 99 to 76 parts by weight of vinyl chloride to graft copolymerization with 1 to 15 parts by weight of a copolymer of 10 to 65 wt% of ethylene and the balance of vinyl acetate and 5 to 30 wt% of carbon black. This conductive composition is advantageous in that various characteristics such as heat resistance, thermal stability, impact resistance, melt fluidity and the like are very good. However, this conductive composition was not always satisfactory as a molding material for video discs of the electrostatic capacitance type. The video discs obtained from such compositions are relatively poor in wear resistance and have the drawbacks that when such a disc is played back or reproduced, there may involve a lowering of reproduction output, deterioration of image quality and defects of pictures due to a failure in contact between the video disc and the pickup stylus. Such video discs have thus little commercial values.

SUMMARY OF THE INVENTION

We made extensive studies on the wear resistance of recording media of the electrostatic capacitance type made of conductive compositions comprising a mixture of a graft polymer between a copolymer of ethylene and vinyl acetate and vinyl chloride monomer with a conductive material. As a result, it was found that the wear resistance is greatly influenced by characteristics of the copolymer of ethylene and vinyl acetate in the graft polymer. In addition, this type of conductive composition should further comprise a specific type of lubricant in order to ensure good contact between the recording medium made from the conductive composition and a pickup stylus.

It is accordingly an object of the present invention to provide information records of the electrostatic capacitance type which have a much improved wear resistance over prior art records.

It is another object of the invention to provide information records which are significantly reduced in picture defects picture when played back and ensure good contact with pickup styli.

In accordance with the present invention, there is used a graft polymer as one of essential components of a conductive composition for information records. The graft polymer is a product of a copolymer of ethylene and vinyl acetate graft-polymerized with a predetermined amount of vinyl chloride monomer. The ethylene-vinyl acetate copolymer should have a content of vinyl acetate of not less than 35 wt% and a melt index up to 20 and should be prepared according to a solution polymerization technique for reasons described hereinafter. The other essential components include a conductive material and a lubricant. The lubricant suitably used in combination with the graft polymer should be esters of aliphatic acids and alcohols having a hydroxyl value not larger than 15.

DETAILED DESCRIPTION AND PREFERRED EMBODIMENTS OF THE INVENTION

In the practice of the invention, the copolymer of ethylene and vinyl acetate in the graft polymer should have a melt index not larger than 20, preferably from 20 to 0.5, when determined by the method prescribed in ASTM D-1238. In order to attain such a melt index as defined above, the content of vinyl acetate in the copolymer should be not less than 35 wt% of the copolymer. Preferably, the content of vinyl acetate should be below 80 wt%, inclusive. Amounts less than the above defined value are unfavorable because wear resistance cannot be improved as desired.

The copolymer of ethylene and vinyl acetate may have properties which vary depending on the polymerization method. For instance, the copolymer may be prepared according to various methods including suspension polymerization, emulsion polymerization, solution polymerization or high-pressure polymerization. Of these, the copolymer obtained by the solution polymerization technique is suitable in view of the fact that these techniques can reduce impurities contained in the final copolymer product as compared with the other techniques.

In order to graft polymerize vinyl chloride with the copolymer of ethylene and vinyl acetate, emulsion polymerization, suspension polymerization, solution polymerization and bulk polymerization techniques may be used. Of these, the suspension polymerization is preferred. This is because according to the suspension polymerization, fine particles which readily mix with particles of the conductive materials can be readily obtained.

In order to prepare a graft polymer of the type described above according to the suspension polymerization, the following procedure is, for example, used. First, ion-exchanged water, suspension stabilizers such as polyvinyl alcohol, radical generators and, if necessary, polymerization retarders are charged into a jacketed polymerization reactor. Then, a copolymer of ethylene and vinyl acetate is charged and suspended, followed by eliminating the air from the reactor and forcing vinyl chloride into the reactor under pressure. The reactor is heated through the jacket whereupon the copolymer is dissolved in vinyl chloride to start graft polymerization. Upon commencement of the graft polymerization, heat of the reaction generates, so that the reaction system is cooled by the use of the jacket until the graft polymerization is caused to proceed to a desired degree. Thereafter, unreacted vinyl chloride is removed and recovered from the reactor, thereby obtaining a slurry of the graft polymer. The slurry is dehydrated, dried and sifted to obtain particles of the graft polymer.

The degree of polymerization of the graft polymer suitable for the purpose of the invention is preferably within a range of from 350 to 600. Smaller degrees of polymerization may result in a lowering of mechanical strength. With degrees of polymerization over 600, the melt viscosity becomes too high to make good workability.

The content of the ethylene-vinyl acetate copolymer in the graft polymer is generally in the range of from 1 to 10 wt% with the balance of vinyl chloride grafted. If the content of the copolymer is less than 1 wt%, the graft polymer has relatively poor mechanical strength. On the other hand, when the content exceeds 10 wt%, rubber elasticity increases with an unfavorable lowering of heat distortion temperature (H.D.T.)

The graft polymers described above are those polymers which are obtained by subjecting vinyl chloride monomer to graft polymerization with ethylene-vinyl acetate copolymers. In addition, other types of graft polymers may be also used in the practice of the invention in which not only vinyl chloride monomer, but also at least one other monomer such as vinyl acetate, ethylene or propylene may be graft-copolymerized with the ethylene-vinyl acetate copolymer. In this connection, however, other monomers should be used in amounts not impeding characteristic properties of the graft polymer itself and are usually employed in an amount up to 10 wt% of the vinyl chloride monomer used. The total content of copolymerizable monomers being graft-polymerized with the copolymer is within the range defined with respect to the vinyl chloride monomer.

Conductive materials used in the conductive resin composition of the present invention are carbon black, metals ordinarily used for these purposes and the like. These materials should be used in the form of a powder to allow good dispersability in the composition. The powder is used in an amount of from 5 to 30 parts by weight per 100 parts by weight of the graft polymer.

The conductive resin composition should further comprise lubricants in order to ensure good and reliable contact of a pickup stylus with disc records formed from the composition. We have found that when the graft polymer dispersing conductive powder is used to form video or digital audio discs, reliability in contact of a pickup stylus with the disc of the electrostatic capacitance type greatly varies depending on the type of lubricant.

If suitable lubricants are not used, the following defects may take place.

(1) Blisters are formed on the surfaces of information records of the electrostatic capacitance type. This will cause the pickup stylus to jump with occurrence of dropouts.

(2) When video discs are kept under high temperature and high humidity conditions, deterioration of an S/N value takes place and, in the worst case, pictures completely disappear, causing termination of the playback operation. These defects are attributed to a failure in contact of the playback stylus with the video disc.

The above defects are obviated when a specific type of lubricant is used in combination with the graft polymer composition comprising conductive powder.

The lubricants useful for this purpose are esters of fatty acids and alcohols having a hydroxyl value not higher than 15, preferably from 10 to 0.1. The fatty acids should preferably have from 10 to 24 carbon atoms and include, for example, capric acid, myristic acid, stearic acid, arachic acid and the like. The alcohols should preferably have from 2 to 24 carbon atoms and include, for example, polyhydric alcohols such as glycerine, glycols, sorbitol, pentaerythritol and the like, and monohydric alcohols such as isobutyl alcohol, stearyl alcohol, palmityl alcohol and the like. In particular, esters of glycerine and fatty acids having from 10 to 24 carbon atoms are preferred.

The lubricants are generally used in an amount of from 0.5 to 5 parts by weight per 100 parts by weight of the graft polymer, within which smooth and reliable contact between a pickup stylus and information records is ensured without producing any adverse influences on moldability and wear resistance.

The graft polymer, conductive powder and lubricant may be mixed and kneaded by any means known to the art in defined amounts, respectively. The resulting conductive composition may further comprise ordinarily used additives such as thermal stabilizers. Compression molding of the conductive composition is carried out by a usual manner and is not described herein.

The present invention is described in more detail by way of preparatory example, examples and comparative examples.

Preparatory Example
Preparation of Graft Polymer

Graft polymerization of vinyl chloride resins was carried out in a 600 liters jacketed autoclave equipped with an agitator. Scales deposited on the inner surfaces of the autoclave were removed by a scraper and tightly sealed. The autoclave was filled with methylene chloride and then heated to 40° C., followed by agitation for 1 hour. Subsequently, the methylene chloride was withdrawn from the autoclave and power water having a pressure of 60 kg/cm²G was injected into the autoclave to completely remove scales therefrom. Ion-exchanged water which was passed through a filter having 0.5 $\mu$m was charged into the autoclave for washing.

Ion-exchanged water used for polymerization was filtered using the same type of filter as used above. Vinyl chloride monomer was passed through a filter having openings of 1 $\mu$m. Ethylene and vinyl acetate copolymer was used after sufficient washing with water passing through a 0.5 $\mu$m filter or after dissolution in vinyl chloride monomer and passage of the resulting solution through a 1 $\mu$m filter.

Sodium polyacrylate used for suspension polymerization was dissolved in the filtered ion-exchanged water at a concentration 0.1 wt% and the other suspension stabilizers were also dissolved similarly at concentrations of 2 wt%. The solutions were used after passage through a filter having openings of 1 $\mu$m. A polymerization initiator was filtered through a filter having openings of 1 $\mu$m.

The suspension polymerization was carried out in a usual manner. The polymerization was terminated and unreacted vinyl chloride monomer was recovered when the rate of polymerization reached 70%.

Subsequently, the reaction product was charged through a 42 mesh metal sieve into a 1000 liters container having a nozzle and an agitator which had been washed with the filtered ion-exchanged water.

Part of the resulting slurry was subjected to a spin dryer placed in a room, which was pressurized with clean air passed through an HEPA filter, thereby obtaining a filter cake. To the cake was added the filtered ion-exchanged water in an amount of 3 times by volume of the cake.

The slurry was agitated for 1 hour, followed by repetition of the above procedure two more times. The resulting filter cake was dehydrated and dried in such a way that no dust was incorporated therein. As a result, particles of a graft polymer of vinyl chloride with the ethylene-vinyl acetate copolymer were obtained.

Graft polymers obtained under different polymerization conditions and characteristics of the graft polymers are summarized in Table 1 below.

TABLE I

| Experiment No. | 1 | 2 | 3 | 4 | 5 | 6 | 7 | 8 |
|---|---|---|---|---|---|---|---|---|
| Ion-exchanged water (kg) | 290 | 290 | 290 | 290 | 290 | 290 | 290 | 290 |
| Vinyl-chloride monomer (kg) | 200 | 200 | 200 | 200 | 200 | 200 | 200 | 200 |
| Ethylene-vinyl acetate copolymer (kg) | 3.2 | 4.8 | 4.8 | 8.0 | 8.0 | 4.8 | 4.8 | 4.8 |
| Polymerization initiator (g) | 200 | 120 | 200 | 200 | 200 | 200 | 200 | 200 |
| Partially saponified polyvinyl acetate (g) | 600 | 1000 | 660 | 700 | 700 | 660 | 660 | 660 |
| Sodium polyacrylate (g) | 60 | 100 | 70 | 70 | 70 | 70 | 70 | 70 |
| Polymerization temp. (°C.) | 74 | 85 | 74 | 74 | 70.5 | 74 | 74 | 74 |
| Polymerization time (hrs.) | 8.0 | 7.0 | 8.0 | 8.0 | 9.0 | 8.0 | 8.0 | 8.0 |
| Degree of polymerization | 480 | 370 | 480 | 480 | 530 | 480 | 480 | 480 |
| Content of ethylene/vinyl acetate copolymer (wt. %) | 2 | 3 | 3 | 5 | 5 | 3 | 3 | 3 |
| Size Distribution | | | | | | | | |
| 42 mesh pass (%) | 100 | 100 | 100 | 100 | 100 | 100 | 100 | 100 |
| 100 mesh pass (%) | 99 | 97 | 99 | 98 | 98 | 99 | 98 | 99 |
| 200 mesh pass (%) | 48 | 53 | 83 | 68 | 49 | 82 | 49 | 82 |
| Apparent density | 0.55 | 0.52 | 0.56 | 0.53 | 0.55 | 0.55 | 0.56 | 0.55 |

In the above table, the ethylene-vinyl acetate copolymers of Nos. 1 through 5 are products which are obtained by a solution polymerization technique and are commercially sold under the name of Levapren 450 from Farbenfabriken Bayer A. G. with a vinyl acetate content of 45 wt% and a melt index of 2.5.

The ethylene-vinyl acetate copolymer of No. 6 is a copolymer which is obtained by a high pressure polymerization technique and is commercially sold under the name of Evaflex 45X from Mitsui Chemicals Company, Limited with a vinyl acetate content of 45 wt% and a melt index of 80.

The ethylene-vinyl acetate copolymer of No. 7 is a copolymer which is obtained by a high pressure polymerization technique and is commercially sold under the name of Ultracene No. 634 from Toyo Soda, Limited with a vinyl acetate content of 28 wt% and a melt index of 6.

The ethylene-vinyl acetate copolymer of No. 8 is a copolymer which is obtained by a high pressure polymerization technique and which is commercially sold under the name of Evaflex 451X from Mitsui Chemicals Co., Ltd. with a vinyl acetate content of 45 wt% and a melt index of 2.

The polymerization initiator is Kaya Ester O commercially available from Kayaku Noury Co., Ltd.

The partially saponified polyvinyl acetate is Gosenol KH-17 commercially available from The Nippon Synthetic Chem. Ind. Co., Ltd.

The sodium polyacrylate used is Aron A-20P commercially available from Toa Synthetic Chem. Ind. Co., Ltd.

EXAMPLES 1-5

One hundred parts by weight of each of the vinyl chloride resins obtained in Experiment Nos. 1 through 5, 5 parts by weight of dibutyl tin mercapto ester stabilizer (RES-1, by Sankyo Organic Chemicals Co., Ltd.), 1.0 part by weight of dimethylpolysiloxane (RES-421, by Shinetsu Chemical Co., Ltd.), 2.0 parts by weight of a fatty acid-glycerine ester having a hydroxyl value of 4 (RES-210, by Riken Vitamins Co., Ltd.), and 0.5 part by weight of an alkyl ester of a fatty acid having a hydroxyl value of 5 (RES-310, by Kao Soaps Co., Ltd.) were mixed in a 20 liter Henschel mixer to a temperature of 110° C., followed by operating the mixer at a low speed so that the temperature was lowered down to 70° C. To the mixture was added 20 parts by weight of conductive carbon black (CSX-150A, by Cabot Co., Ltd., U.S.A.), followed by heating again to 110° C. and agitating at a high speed for 15 minutes. Thereafter, the mixture was cooled down to room temperature.

The mixture was pelletized by means of a kneader, PR-46 made by Buss Co., Ltd., Switzerland. The resulting pellets were passed through a metal separator and over magnets to remove metals from the pellets or metal-containing pellets and pressed by a video disc press to obtain video discs.

EXAMPLE 6

The general procedure of Example 3 in which the vinyl chloride resin of No.3 was used was repeated except that the fatty acid-glycerine ester was replaced by a fatty acid-glycerine ester having a hydroxyl value of 4 (S-900, by Riken Vitamins Co., Ltd.), thereby obtaining video discs.

COMPARATIVE EXAMPLES 1-3

The general procedure of Example 1 in which the vinyl chloride resin of No. 1 was used was repeated except that the vinyl chloride resins of Nos. 6 through 8 were used instead of the vinyl chloride resin of No.1, thereby obtaining video discs.

COMPARATIVE EXAMPLE 4

The general procedure of Example 1 was repeated except that a fatty acid-glycerine ester having a hydroxyl value of 325 (S-100, by Riken Vitamins Co., Ltd.) was used instead of the ester of Example 1, thereby obtaining video discs.

The video discs of the electrostatic capacitance type obtained in Examples 1 through 5 and Comparative Example 1 through 3 were each set in a playback system and subjected to measurement of a degree of deterioration of Y-S/N value under frame-freezing or still reproduction conditions of 2 hours while measuring the Y-S/N value of gray 50IRE recorded at a position where it took 54 minutes from the outermost track of the video disc. The degree of deterioration of the S/N value was determined such that ten to twelve video discs of each of the Examples and Comparative Examples were provided. Each disc was tested three times while changing the track every 2 hours. The discs whose degree of deterioration was within 3 dB were determined as acceptable, and determined as unacceptable were discs whose degree was over 3 dB or in which the stylus jumped. The degree of deterioration is shown in Table 2 as an acceptance rate by percent.

TABLE 2

|  | Ethylene-Vinyl Acetate Copolymer | | | Degree of | |
|---|---|---|---|---|---|
|  | Method of Polymerization | Content of Vinyl Acetate (%) | Melt Index | Polymerization of Graft Polymer | Acceptance Rate (%) |
| Ex. 1 | Solution Polymerization | 45 | 2.5 | 480 | 87.5 |
| 2 | Solution Polymerizaton | 45 | 2.5 | 370 | 75 |
| 3 | Solution Polymerization | 45 | 2.5 | 480 | 100 |
| 4 | Solution Polymerization | 45 | 2.5 | 480 | 75 |
| 5 | Solution Polymerization | 45 | 2.5 | 530 | 100 |
| Com. Ex. 1 | High-pressure Polymerization | 45 | 80 | 480 | 62.5 |
| 2 | High-pressure Polymerization | 28 | 6 | 480 | 62.5 |
| 3 | High-pressure Polymerization | 45 | 2 | 480 | 100 |

Eight video discs of the electrostatic capacitance type obtained in each of Examples 3, 6 and Comparative Example 1 through 4 were provided and divided into four groups each consisting of two discs. These groups were, respectively, allowed to stand in air-conditioned chambers having a temperature of 40° C. and a relative humidity of 90% for 24, 58, 72 and 96 hours. While the discs of each group were reproduced, each at opposite sides, in a playback system at a fivefold speed, the resulting output was taken out as an FM output and its variation was measured and assessed as (1) very poor, (2) poor, (3) moderate, (4) good and (5) very good. In this assessment, the term "very good" means that no output variation was recognized and the term "very poor" means that the variation of the FM output was so great that no reproduction was possible with respect to all the tested video sides. The results are shown in Table 3 below.

TABLE 3

|  | Example | | Comparative Example | | | |
|---|---|---|---|---|---|---|
|  | 3 | 6 | 1 | 2 | 3 | 4 |
| Degree of polymerization of graft polymer | 480 | 480 | 480 | 480 | 480 | 480 |
| Copolymer of Ethylene and Vinyl Acetate: | | | | | | |
| Melt Index | 2.5 | 2.5 | 80 | 6 | 2 | 2.5 |
| Content of VA | 45 | 45 | 45 | 28 | 45 | 45 |
| Method of polymerization | solution polymerization | | high-pressure polymerization | | | Solution polymerization |
| Fatty Acid/Glycerine Ester: | | | | | | |
| Hydroxyl value | 4 | 4 | 4 | 4 | 4 | 325 |
| Form | liquid | powder | liquid | liquid | liquid | powder |
| Evaluation: | | | | | | |
| After 24 hrs. | 4 | 5 | 3 | 2 | 3 | 2 |

TABLE 3-continued

|  | Example | | Comparative Example | | | |
|---|---|---|---|---|---|---|
|  | 3 | 6 | 1 | 2 | 3 | 4 |
| After 48 hrs. | 5 | 5 | 4 | 3 | 3 | 3 |
| After 72 hrs. | 5 | 4 | 4 | 3 | 3 | 3 |
| After 96 hrs. | 5 | 4 | 3 | 2 | 2 | 2 |
| overall evaluation | 5 | 5 | 4 | 3 | 3 | 3 |

From Table 3, it will be seen that the quality of video discs is greatly influenced depending on whether or not the ethylene-vinyl acetate copolymer is obtained by the solution polymerization technique and whether or not the ester lubricant has a hydroxyl value within a defined range. The video discs obtained according to the present invention ensure good contact between the disc and a pickup stylus and involve only a very small variation of FM output.

What is claimed is:

1. In a high density information record of the electrostatic capacitance type which comprises a record substrate on which signal information is recorded as geometric variations and which is made of a conductive resin composition comprising 100 parts by weight of a graft polymer between a copolymer of ethylene and vinyl acetate and monomeric vinyl chloride in a ratio by weight of 1 to 10:99 to 90, which copolymer has a content of vinyl acetate not less than 35 wt%, and 5 to 30 parts by weight of a conductive powder and 0.5 to 5 parts by weight of a lubricant dispersed in said graft polymer, the improvement wherein said copolymer is obtained by solution polymerization and has a melt index not larger than 20 and said lubricant is an ester between a fatty acid and an alcohol having a hydroxyl value not larger than 15.

2. The information record according to claim 1, wherein the copolymer has a melt index not less than 0.5.

3. The information record according to claim 1, wherein the content of the vinyl acetate in the copolymer is not higher than 80 wt%.

4. The information record according to claim 1, wherein said graft polymer is a product obtained by graft polymerization between said copolymer and a mixture of vinyl chloride monomer and at least one copolymerizable monomer, said copolymerizable monomer being used in an amount up to 10 wt% of said vinyl chloride monomer.

5. The information record according to claim 1, wherein the graft polymer has a degree of polymerization of from 350 to 600.

6. The information record according to claim 1, wherein the ester lubricant has a hydroxyl value of from 0.01 to 10.

7. The information record according to claim 6, wherein said ester lubricant consists of a fatty acid having from 10 to 24 carbon atoms and glycerine.

8. The information record according to claim 7, wherein said ester lubricant is an ester of glycerine and a fatty acid having from 10 to 24 carbon atoms.

* * * * *